(12) United States Patent
Dominka

(10) Patent No.: US 7,824,175 B2
(45) Date of Patent: Nov. 2, 2010

(54) INJECTION MOLDING ANTI-DROOL NOZZLE

(76) Inventor: John Dominka, 36425 Maas, Sterling Heights, MI (US) 48312

( * ) Notice: Subject to any disclaimer, the term of this patent is extended or adjusted under 35 U.S.C. 154(b) by 136 days.

(21) Appl. No.: 12/136,844

(22) Filed: Jun. 11, 2008

(65) Prior Publication Data

US 2009/0311364 A1  Dec. 17, 2009

(51) Int. Cl.
*B29C 45/22* (2006.01)
(52) U.S. Cl. .................... 425/562; 425/563
(58) Field of Classification Search .......... 425/562, 425/563, 564
See application file for complete search history.

(56) References Cited

U.S. PATENT DOCUMENTS

| | | | |
|---|---|---|---|
| 2,345,917 A * | 4/1944 | Coffman | 425/563 |
| 3,590,439 A * | 7/1971 | Swanson | 425/564 |
| 4,333,608 A | 6/1982 | Hendry | |
| 4,983,117 A | 1/1991 | Von Buren et al. | |
| 5,012,839 A | 5/1991 | Rogers et al. | |
| 5,380,188 A * | 1/1995 | Ullisperger | 425/563 |
| 5,968,562 A | 10/1999 | Schad et al. | |
| 6,348,171 B1 | 2/2002 | Dewar et al. | |
| 6,454,558 B1 | 9/2002 | Gellert | |
| 6,604,933 B1 | 8/2003 | Kern | |
| 6,793,480 B2 * | 9/2004 | Dominka | 425/563 |
| 6,835,060 B2 | 12/2004 | Sicilia | |
| 6,910,877 B2 | 6/2005 | Berceanu et al. | |

* cited by examiner

*Primary Examiner*—Tim Heitbrink
(74) *Attorney, Agent, or Firm*—VanOphem & VanOphem, PC

(57) ABSTRACT

A shutoff nozzle body and valve assembly operative to reduce molten plastic resin drool when the nozzle body is separated from the mold or runner system. The apparatus includes a porting system that shuts off the flow of resin through the sprue plunger of the valve nozzle body before the valve body seals on the valve seat so as to permit any resin that is within the sprue passages to drain out through the sprue plunger into the mold cavity or runner system before the sprue tip completely withdraws from the mold or runner system thereby eliminating drool.

5 Claims, 4 Drawing Sheets

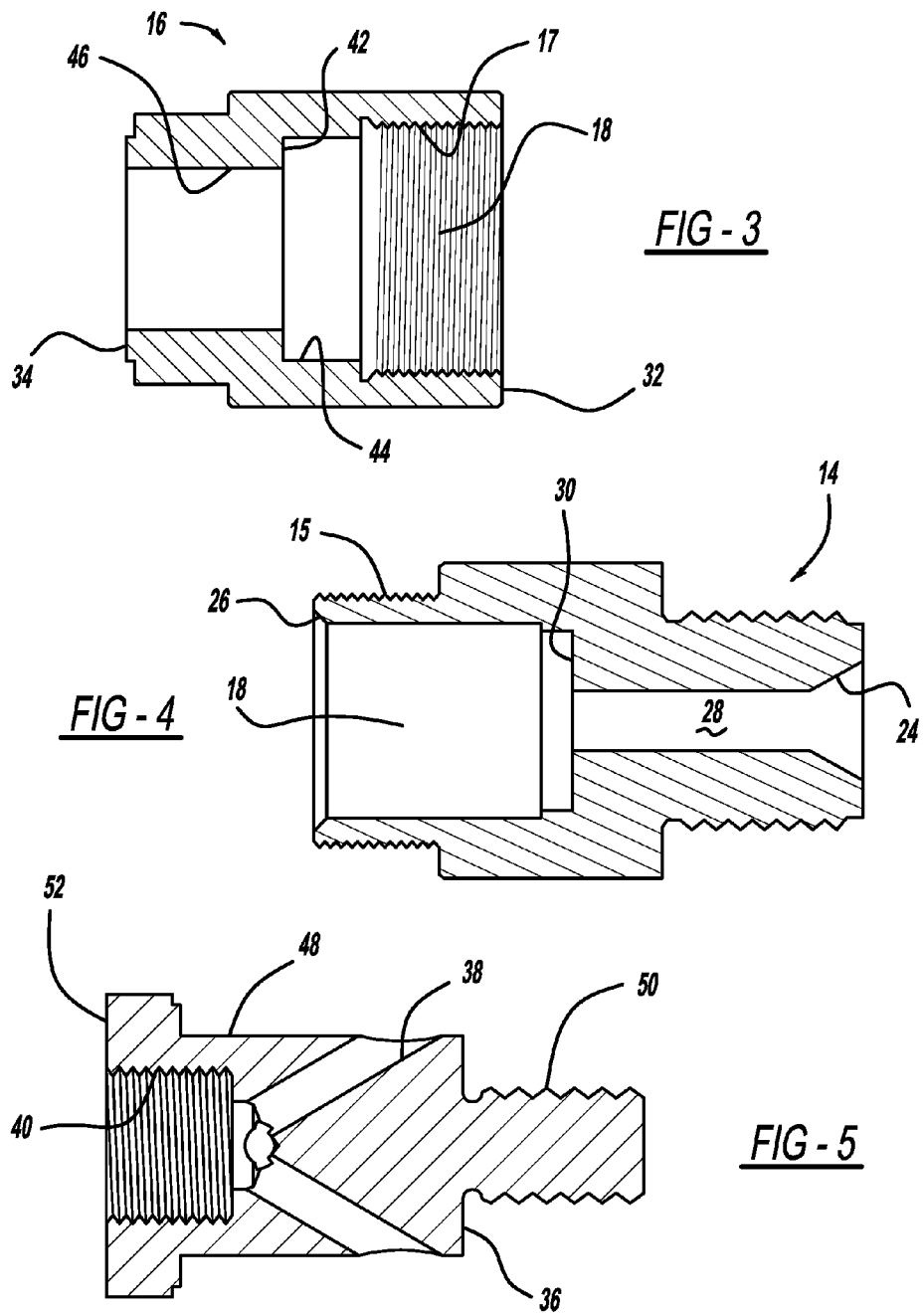

INJECTION MOLDING ANTI-DROOL NOZZLE

CROSS-REFERENCE TO RELATED APPLICATIONS

Not Applicable.

FEDERALLY SPONSORED RESEARCH OR DEVELOPMENT

Not Applicable.

REFERENCE TO SEQUENCE LISTING

Not Applicable.

BACKGROUND OF THE INVENTION

1. Field of the Invention

This invention is directed generally to an injection nozzle assembly. More particularly, this invention is directed to a heated plastic flow control nozzle assembly for use in plastic molding which significantly reduces drool upon separation of the nozzle assembly from a mold or hot runner.

2. Description of the Prior Art

The use of plastic products has become widespread in all industries today. A typical molded part is made by filling a mold cavity with pressurized molten plastic, allowing the plastic to cool, and removing the molded article from the mold cavity. It is important in injection molding processes to control the flow of the resinous material in order to avoid the waste of material which increases operating costs and reduces profits.

A typical plastic injection machine nozzle engages a mold or a hot runner system associated with the mold. Before the mold halves are separated to permit removal of the molded plastic part, the nozzle must be separated from the hot runner or mold. This separation withdraws the nozzle from its seat in the mold or the runner and the molten plastic in the nozzle is apt to drool out. Such drool results not only in a loss of material but can cause problems in the molding process. For example, the drooling hot plastic is apt to run out into the runner system or into the mold after the part is removed. Such plastic accumulation may adversely affect the operation of the mold by not permitting the mold to close properly or inhibit proper heat exchange during cooling of the mold. Further, such drooling may result in partial voids in the runner system leading to incomplete mold cavity charging.

Various controls have been proposed to control the shutoff nozzle to attempt to eliminate drool. In U.S. Pat. No. 2,318,031 issued to Tucker, one type of nozzle shutoff is disclosed. Here, the nozzle utilizes a rotary valve mounted at the output of the nozzle itself. This valve in turn, is rotated by a hydraulic motor which disconnects a passage through the valve body to disconnect the flow of plasticized resin. Another valve method is shown in this patent wherein the opening of the nozzle is accomplished by a pure mechanical means. Here a valve closure has a rod connected to the valve protruding from the end of the nozzle. As the mold is closed, the rod engages the mold surface and opens the valve to allow material to flow into the mold. As the mold is opened the valve will shutoff from the pressure of the resin inside the unit.

U.S. Pat. No. 3,231,938 issued to Seymour, shows a spring operated nozzle means wherein the flow of plasticized resin will increase the pressure in the nozzle and cause the shut-off to be pushed against the spring, thus opening the entrance to the mold. Upon completion of the injection step, the pressure of the resin will be reduced and the spring will push the shutoff member back into its original position thereby disconnecting the flow of plasticized resin to the mold. Another U.S. Pat. No. 3,241,191 issued to Nouel, shows a spring-lever type mechanical method for operating the shutoff valve whereby resin under pressure forces the nozzle shutoff to a mid-position acting to regulate the flow of resin through the tip of the nozzle. The valve is double acting and when the mold is filled, the pressure of the resin inside the mold will force back the shutoff through a mechanical arm against a spring which shuts off the flow of resin to the mold. Here the flow of resin and spring biasing means are used to open and return the valve to its shutoff position.

U.S. Pat. No. 3,571,856 issued to Voelker, shows a shutoff means whereby the control is by a hydraulic actuator which is connected to a rod inside a ball and socket connected to a manifold means having an orifice opening into the mold. The rod is capable of being moved to open or shutoff the orifice to the mold. The rod operates as a valve to disconnect plasticized resin from flowing through the nozzle means through the orifice into the mold cavity.

Another means of shutting off or disconnecting the flow of plasticized resin through a nozzle is shown in U.S. Pat. No. 3,902,665 issued to Hendry. This patent discloses various nozzle shut-off means being operated by a fluid pressure to stop the flow of plasticized resin from the extruder into the nozzle itself. Here, the opening and closing of the nozzle shut-off means can be by a fluid means or the opening of the shut-off can be caused by the force of plasticized resin against the shut-off rod pushing the valve back to its seated position. The return to a closed position is by a compressed air or fluid means. U.S. Pat. No. 3,649,148 issued to Waltman, shows a means for controlling the orifice of a nozzle which operates using a fluid means to control the wall thickness of plasticized resin as it is extruded from the nozzle in the manufacture of blow molded bottles.

Rogers et al., U.S. Pat. No. 5,012,839, discloses a flow control valve intended to be used primarily with a hot runner manifold in a mold of a molding press to prevent plastic drool or seepage when the molten plastic injection nozzle is separated from the mold. The heated plastic flow control valve assembly disclosed utilizes a slide valve which is telescopingly slidable with respect to a valve body to provide positive flow control for molten plastic. The slide valve has a central plastic flow passage whose discharge openings are closed when the discharge end of the slide valve telescopes within the valve body. A coil spring surrounds the slide valve and provides the valve closing force. The body of the valve assembly is surrounded by a band heater while the sprue core portion of the valve assembly, which cooperates with the hot runner manifold in the mold, is provided with a coil heater. These two heaters are individually controllable to ensure that the plastic material in the valve assembly is kept at the proper temperature.

As can be seen from the above discussion of the prior art, what is needed is a nozzle assembly which will prevent plastic seepage or drooling of plastic material, thereby avoiding adverse operation of the molding process, reduce down time and loss of costly material.

SUMMARY OF THE PRESENT INVENTION

The present invention is directed towards an improved shutoff nozzle which shuts off the flow of resin without the need to receive or reduce the pressure of the molten plastic resin. The disclosed shutoff nozzle assembly includes a nozzle body, a sprue plunger, a coil spring, a valve body, and a spring guide. In the following description, the words "front" and "rear" are defined according to the flow direction of the molten plastic resin.

The nozzle body is generally cylindrical and preferably includes an upstream or front portion threadably connected to a downstream or rear portion. The downstream end of the nozzle rear body is adapted to connect to a mold cavity or runner system while the front end of the nozzle front body is adapted for connection to a conventional injection molding machine, a structural foam process machine, or a gas assist process machine. The nozzle body further includes an internal central passageway that is restricted to form an inlet passage at the front or upstream end and a discharge opening at the rear or downstream end.

The downstream portion of the nozzle body includes a valve seat and internal diameter to receive a sprue plunger which includes internal passages to allow the plastic resin to flow through the valve when the valve member is in an open position. The flow of plastic resin through the central internal passageway is controlled by a valve member and spring guide mounted within the central internal passage of the nozzle front and rear bodies. The valve member and spring guide is threadably mounted on the upstream end of the sprue plunger. As the sprue plunger slides within the central internal passage of the nozzle rear body, the valve member is moved from a position in contact with the valve seat to close the flow of plastic resin through the nozzle body to a second position away from the valve seat to allow plastic resin to flow through the internal central passageway of the nozzle body. One end of the valve member acts as a spring guide for a compression spring having one end mounted against a shoulder within the central internal passage of the nozzle front body and an opposite end mounted to the spring guide portion of the valve member which extends in a direction away from the valve seat within the internal central passage of the nozzle rear body.

The nozzle and valve assembly of the present invention utilizes the spring load to maintain the valve in a closed position. Further, direct plastic resin pressure acts in conjunction with the spring force to maintain the valve body onto the valve seat to terminate resin flow through the central internal passage. To initiate resin flow through the central internal passage, the complete nozzle body is moved towards a mold or runner system until a sprue tip mounted in the sprue plunger makes contact therewith. The movement is continued until there is sufficient force on the sprue plunger to overcome the combined biasing force of the compression spring as well as the force of the plastic resin pressure to lift the valve body off the valve seat. At this point there is still no resin flow. The plastic resin will begin to flow through the central internal passage after the sprue plunger has traveled a sufficient distance to move the internal passages within the plunger past the valve seat such that the plastic resin can flow into these internal passages and through the internal passages in the sprue plunger and the sprue tip, past the sprue tip and into the mold or runner system. To terminate the flow of plastic resin, the nozzle body is moved in a direction away from the mold or runner system, allowing the spring to decompress and thereby move the valve body and spring guide towards the valve seat in the nozzle rear body. At the same time, the sprue plunger and its internal passages under the force of the compression spring travel across the valve seat into the internal diameter of the nozzle rear body and terminate communication of resin flow past the valve seat, allowing the plastic resin within the sprue plunger to run into the mold or runner system. Thereafter, the valve body and spring guide are forced onto the valve seat to seal the shutoff valve and insure complete termination of plastic resin flow past the valve seat so that drooling of plastic resin from the valve sprue is completely eliminated. The force of the high-pressure plastic resin acts on the backside of the valve body to create an effective force that assists the compression spring in maintaining the valve body on the valve seat to maintain the valve in a closed position.

Accordingly, it is an object of the present invention to provide a flow control valve to stop plastic resin drool.

Another object of the present invention is to provide a self-actuating nozzle assembly that shuts off the flow of plastic resin and permits the resin in the sprue plunger to run into the mold or runner system, after the shutoff valve has stopped the flow of resin through the internal passages of the sliding sprue plunger. As the sprue plunger is further moved away from the mold, the valve body seats on the valve seat and completely stops the flow of plastic resin into the sprue plunger to thereby completely eliminate drool of plastic resin from the sprue plunger.

It is yet a further object of the present invention to provide a nozzle assembly that is of simple construction with few moving parts.

It is yet a further object of the present invention to provide a nozzle body assembly that is reliable and requires minimal operator attention.

It is yet a further object of the present invention to provide a self-actuating nozzle assembly that is economical, easy to manufacture and assemble, and that is safe and effective in releasing pressure from the molded article.

For a more complete understanding of the nozzle apparatus of the present invention, reference is made to the following detailed description and accompanying drawings in which the presently preferred embodiment of the invention is shown by way of example. As the invention may be embodied in many forms without departing from the spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 3 is a sectional view of the downstream nozzle rear body of the invention;

FIG. 4 is a sectional view of the upstream nozzle front body of the invention;

FIG. 5 is a sectional view of the sprue plunger of the invention;

DETAILED DESCRIPTION OF THE PREFERRED EMBODIMENT

Figure 1:
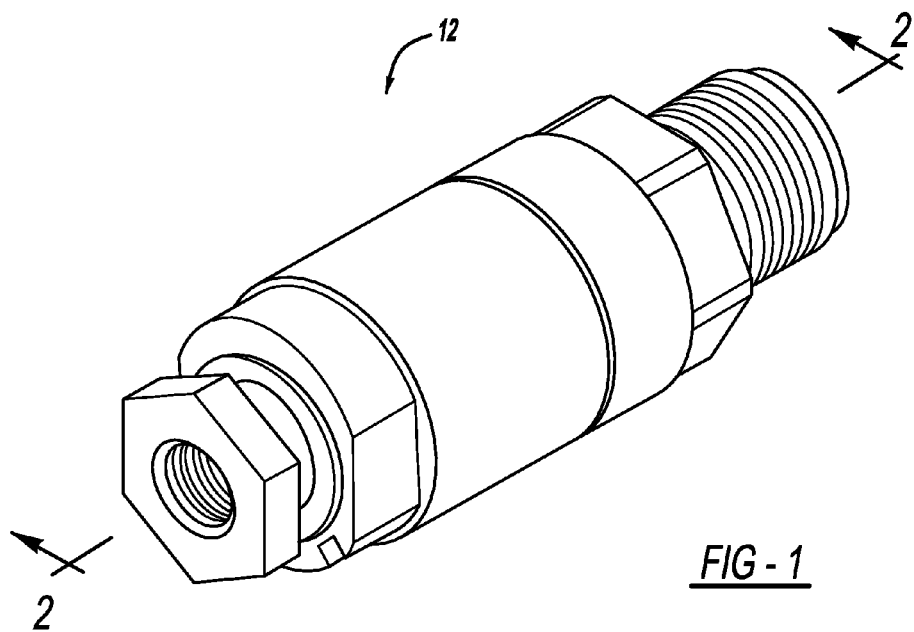
FIG. 1 is an isometric view of the preferred embodiment of the nozzle assembly of the present invention.

Referring now to the drawings, there is shown in FIGS. 1-9 a preferred embodiment of a shutoff nozzle body and valve assembly which eliminates drool according to the present invention. The drool eliminator shutoff nozzle body and valve assembly includes a front 14 and rear 16 nozzle body, a shutoff valve body and spring guide 54, a helical spring 56, and a sprue plunger 36 attached to the rear nozzle body 16. In the following description, the words "front" and "rear" are defined according to the flow direction of the molten resin.

The nozzle body 12 is generally cylindrical and preferably includes a front nozzle body 14 or upstream portion detachably threadably connected to a rear nozzle body 16 or downstream portion. The front nozzle body 14 or upstream portion is preferably a male threaded portion 15 which is threaded into a female rear nozzle body 16 or downstream portion having a female interior thread 17. The nozzle body 12 includes a central passageway 18 having an inlet passage 20 and a discharge opening 22.

Referring to FIG. 4, the front nozzle body 14 or upstream portion of the nozzle body 12 has in inlet end 24 and outlet end 26. The outlet end 26 is open defining a portion of the central passageway 18. The inlet end 24 is restricted thereby forming an inlet passage 28, the internal diameter of the inlet passage 28 being smaller than the internal diameter of the central passageway 18. An internal shoulder 30 connects the central passageway 18 with the inlet passage 28. The inlet end 24 of the front nozzle body 14 or upstream portion of the nozzle body 12 is adapted to establish a connection between the inlet passage 28 and a conventional molding machine (not shown).

Figure 2:
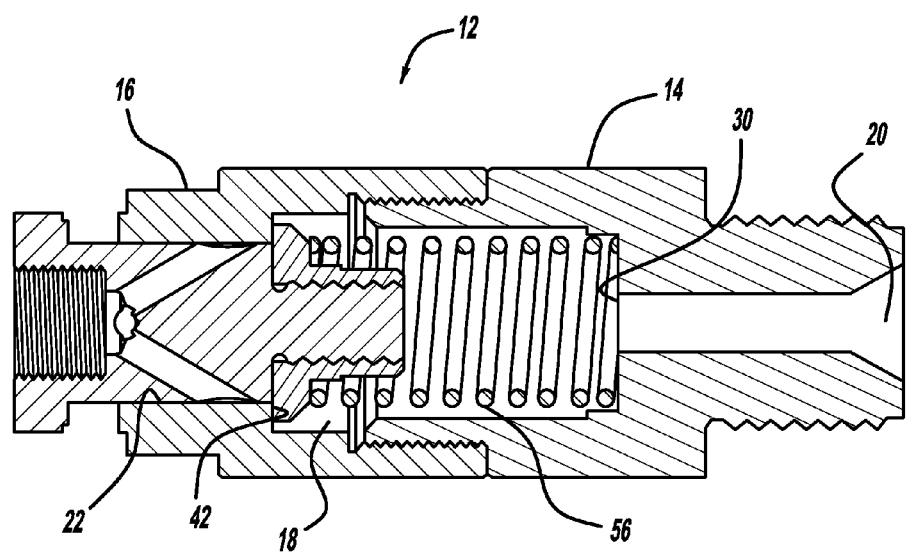
FIG. 2 is a cross-sectional view of the nozzle assembly of FIG. 1.
Figure 6:
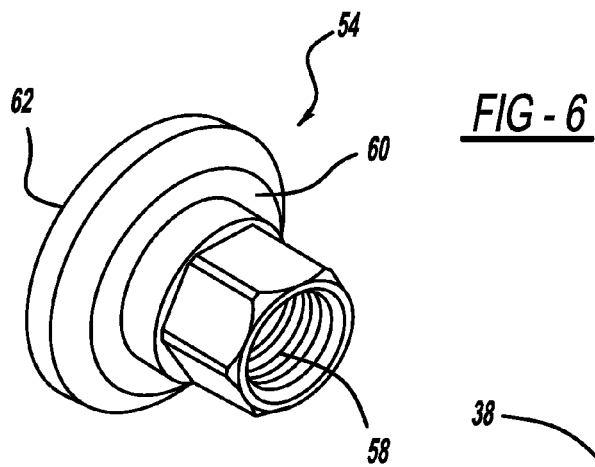
FIG. 6 is an isometric view of the sprue plunger of the invention.
Figure 7:
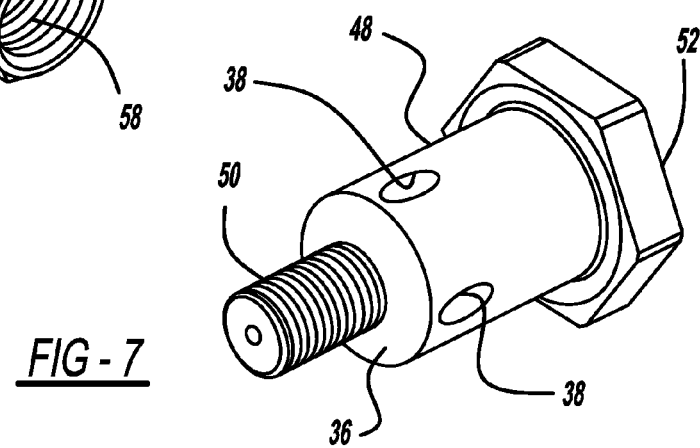
FIG. 7 is an isometric view of the valve body and spring guide of the invention.
Figure 8:
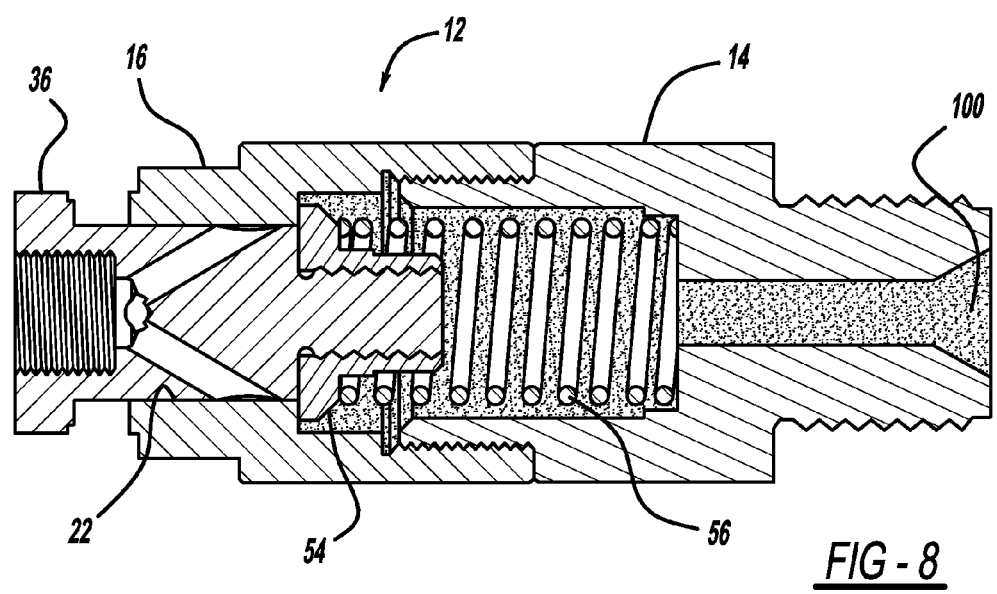
FIG. 8 is a sectional view of the nozzle body of FIG. 1 illustrating the plastic resin within the nozzle body when the valve is in a closed position.
Figure 9:
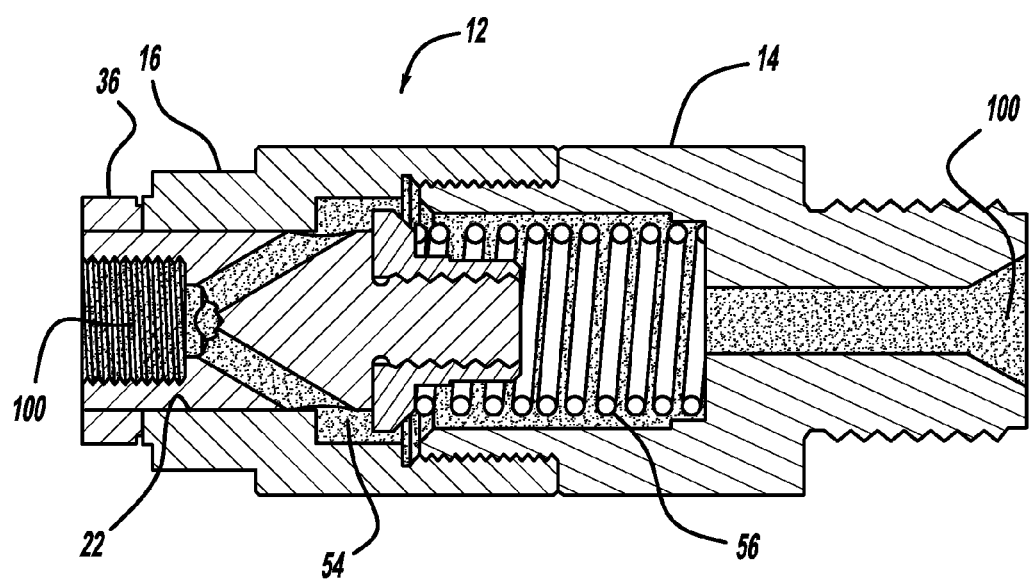
FIG. 9 is a sectional view of the nozzle body of FIG. 1 illustrating the plastic resin flow through the nozzle body when the valve is in an open position.

Referring to FIG. 3, the rear nozzle body 16 or downstream portion of the nozzle body 12 has an inlet end 32 and an outlet end 34. The inlet end 32 of the rear nozzle body 16 or upstream portion of the nozzle body 12 is open defining a portion of the central passageway 18. The outlet end 34 of the rear nozzle body 16 or upstream portion of the nozzle body 12 is restricted to receive the sprue plunger 36 (shown in FIG. 5) having internal passages 38 which communicate with a discharge opening 40 in the sprue plunger 36, the internal diameter of the discharge opening 40 being smaller than the internal diameter of the central passageway 18. A valve seat 42 created by an internal shoulder 44 in the rear nozzle body 16 separates the central passageway 18 and the discharge opening 40. The downstream portion of the rear nozzle body 16 of the nozzle body 12 includes an internal diameter 46 that receives the outer diameter 48 of the sprue plunger 36 shown in FIG. 5. The sprue plunger 36 includes an upstream end having a male threaded end portion 50 for receiving a shutoff valve body and spring guide 54 as will hereinafter be discussed. As shown in FIG. 5, the downstream end portion 52 of the sprue plunger 36 has an outer diameter 48 that mates with the internal diameter 46 of the rear nozzle body 16 utilizing a slip fit. Between the male threaded end portion 50 and the discharge opening 40 are a plurality of internal passages 38 which are machined at an acute angle with respect to the central axis of the sprue plunger 36 to permit molten resin to flow through the nozzle body 12. When the mold is being filled, the resin flows through the central passageway 18 past the open valve seat 42 and into the plurality of internal passages 38 towards the discharge opening 40 of the sprue plunger 36 as illustrated in FIG. 9. Fluid communication of the molten resin is terminated by the shutoff valve body and spring guide 54 seating on the valve seat 42 when the molding machine has completed its injection of the molten resin into the mold or runner system, as shown in FIG. 8 and will be discussed hereinafter. In FIG. 6, the shutoff valve body and spring guide 54 with a helical spring 56 (not shown) are mounted in the central passageway 18 to complete the shutoff nozzle body and valve assembly. The shutoff valve body and spring guide 54 has an internal threaded hole 58 which is threaded onto the male threaded end portion 50 of the sprue plunger 36. One end of the shutoff valve body and spring guide 54 supports the helical spring 56 that is mounted within the central passageway 18 as shown in FIG. 2. One end of the helical spring 56 abuts the internal shoulder 30 of the front nozzle body 14 while the opposite end of the helical spring 56 abuts the backside or one end of the outer flange 60 of the shutoff valve body and spring guide 54. The front face 62 of the shutoff valve body and spring guide 54 is a valve surface that seats on the complimentary valve seat 42 of the rear nozzle body 16.

Although not essential for the operation of the invention, the helical spring 56 (shown in FIG. 2) will be described in the context of the preferred embodiment. Other embodiments implementing alternative means for biasing the shutoff valve body and spring guide 54 against the valve seat 42 of the rear nozzle body 16 to shutoff the central passageway 18 can be envisioned. The helical spring 56 is configured to bias the shutoff valve body and spring guide 54 rearwards toward the valve seat 42 of the rear nozzle body 16. Since the shutoff valve body and spring guide 54 is mounted to the male threaded end portion 50 of the sprue plunger 36, the helical spring 56 also biases the sprue plunger 36 in the downstream direction.

As viewed in FIGS. 8 and 9, the drool eliminator shutoff nozzle body and valve assembly of the present invention in operation uses direct resin pressure in addition to the biasing spring force of the helical spring 56 to keep the shutoff valve body and spring guide 54 on the valve seat 42 of the rear nozzle body 16 in a closed position to prevent flow of molten plastic resin 100 through the shutoff nozzle body and valve assembly.

The molding cycle begins by the molding machine (not shown) advancing the shutoff nozzle body and valve assembly towards the mold or runner system inlet (not shown) as the sprue tip (not shown), mounted in the threaded passage of the discharge opening 40 of the sprue plunger 36, advances towards the mold or runner system and upon contact, the sprue plunger 36 can no longer advance but the front and rear nozzle body 14, 16 continues to advance toward the mold. The relative movement of the valve seat 42 of the rear nozzle body 16 with respect to the front face 62 of the shutoff valve body and spring guide 54 lifts the front face 62 off the valve seat 42 and compresses the helical spring 56. Resin flow into the internal passages 38 of the sprue plunger 36 does not begin until the shutoff valve body and spring guide 54 has traveled a sufficient distance to allow the inlet of the internal passages 38 to slide past the valve seat 42 of the rear nozzle body 16. As the helical spring 56 continues to be compressed by the relative movement of the front and rear nozzle bodies 14, 16 with respect to the stationary sprue plunger 36. Molten plastic resin 100 begins to flow past the valve seat 42 into the internal passages 38 of the sprue plunger 36 and along the discharge opening outer diameter 48 past the sprue tip (not shown) and into the mold or runner system, until the complete shot of molten plastic resin 100 is injected into the mold. Upon completing the injection shot, the molding machine is programmed to begin withdrawal of the shutoff nozzle body and valve assembly. As the nozzle body 12 retracts in a direction away from the mold or runner system, the sprue plunger 36 remains in contact with the mold or runner system under the influence of the helical spring 56 bias. The relative motion between the rear and front nozzle bodies 14, 16 and the shutoff valve body and spring guide 54 screwed to the male threaded end portion 50 of the sprue plunger 36, results in the inlets to the internal passages 38 to slide past the valve seat 42 and shutoff the flow of molten plastic resin 100 as the internal passages 38 travel past the valve seat 42 of the rear nozzle body 16 before the front face 62 of the shutoff valve seat and spring guide 54 seats on the valve seat 42 of the rear nozzle body 16. As the molten resin flow 100 is shutoff, the portion remaining in the internal passages 38 and discharge opening 40 of the sprue plunger 36 continues to flow into the mold or runner system. As the shutoff nozzle body and valve assembly continues to travel away from the mold or runner system, the front face 62 of the shutoff valve body and spring guide 54 will come into contact with valve seat 42 of the rear nozzle body 16 to completely seal the passage of molten plastic resin 100 through the central passageway 18 and withdraw the sprue plunger 36 and sprue tip from contacting the mold or sprue system inlet. Since all of the molten plastic resin 100 in the internal passages 38 and discharge opening 40 of the sprue plunger 36 has already emptied into the mold or runner system, there is practically no molten plastic resin 100 that is able to drool out of the sprue plunger 36 and sprue tip as it withdraws from the mold or runner system.

It is evident that many alternatives, modifications, and variations of the nozzle assembly and method of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A shutoff nozzle assembly for injection molding, said shutoff nozzle assembly comprising:
    a nozzle body having:
        one end defining a nozzle front body portion; and
        an opposite end defining a nozzle rear body portion mounted to said front body portion, said nozzle body having a central passageway having a valve seat, said central passageway extending partially into said nozzle front body portion and partially into said nozzle rear body portion;
        an inlet passage formed at one end of said nozzle front body portion of said nozzle body in fluid communication with said central passageway;
        a discharge opening formed at an opposite end of said nozzle rear body portion of said nozzle body, said discharge opening being in fluid communication with said central passageway;
    a valve body disposed in said central passageway of said nozzle body, said central passageway being sealed when said valve body is in a first position and being open when said valve body is in a second position; and
    a sprue plunger slidably mounted in said discharge opening of said rear body of said nozzle body when said valve body is in said first position, said sprue plunger having a male threaded end portion at one end thereof and a plurality of internal passages such that fluid communication through said discharge opening is terminated when said valve body is in said first position and said plurality of internal passages are in fluid communication with said central passageway to flow molten plastic resign through said nozzle body when said valve body is in said second position;
    means for biasing said valve body into said first position such that said central passageway is sealed.

2. The shutoff nozzle assembly as claimed in claim 1, wherein said valve body is a valve body and spring guide, said valve body and spring guide being mounted to said male threaded end portion of said sprue plunger in spaced relation to said valve seat of said central passageway; and wherein said means for biasing further comprises a biasing member having one end mounted to said nozzle front body portion and an opposite end mounted to said valve body and spring guide for biasing said valve body and spring guide to said first position whereby fluid communication through said central passageway is terminated.

3. A shutoff nozzle assembly for injection molding, said shutoff nozzle assembly comprising:
    a nozzle body having:
        one end defining a front body portion, said front body portion having an inlet passage formed at one end for receiving molten plastic under pressure and an opposite end having a threaded outside diameter;
        an opposite end defining a rear body portion, said rear body portion having one end defining an internal threaded diameter portion;
        said opposite end having a discharge opening and an internal shoulder having a valve seat therebetween, said nozzle body further having a central passageway partially extending into said front body portion, said central passageway further partially extending into said rear body portion; said molten plastic resin under pressure flowing through said inlet passage into said central passageway;
    a valve body and spring guide disposed in said central passageway of said nozzle body, said valve body and spring guide having an internal threaded diameter, said valve body and spring guide being moved to a first position by the effective force of said pressurized molten plastic resin to seat on said valve seat and seal said central passageway from fluid communication, said valve body and spring guide permitting fluid communication of said molten plastic resin through said central passageway when said valve body and spring guide are moved to an open second position; and
    means for biasing said valve body and spring guide from said closed first position to said open second position.

4. The shutoff nozzle assembly as claimed in claim 3 wherein said means for biasing further comprises a sprue plunger slidably mounted in said discharge opening of said rear body portion of said nozzle body, said sprue plunger having a male threaded end portion at one end thereof and a plurality of internal passages, said internal threaded diameter of said valve body and spring guide threadably mounted to said male threaded end portion of said one end of said sprue plunger whereby under the influence of the effective force of said molten plastic resin in said central passageway, said sprue plunger is moved towards said first position terminating molten plastic resin communication through said plurality of internal passages before said valve body seats on said valve seat in said nozzle rear body portion of said nozzle body.

5. The shutoff nozzle assembly as claimed in claim 4 further comprising a biasing member mounted in said central passageway, said biasing member having one end mounted to said nozzle front body portion, and an opposite end mounted to said valve body and spring guide for biasing said valve body and spring guide to said first position whereby fluid communication through said central passageway is terminated.

* * * * *